UNITED STATES PATENT OFFICE.

KARL MARX, OF DESSAU, GERMANY, ASSIGNOR TO ACTIEN GESELLSCHAFT FÜR ANILIN FABRIKATION, OF BERLIN, GERMANY.

PROCESS FOR DYEING FURS, HAIRS, AND THE LIKE.

1,105,447.   Specification of Letters Patent.   Patented July 28, 1914.

No Drawing.   Application filed February 21, 1913. Serial No. 749,832.

*To all whom it may concern:*

Be it known that I, KARL MARX, a subject of the Duke of Brunswick, residing at Dessau, Germany, my post-office address being Albrechtstrasse 16, Dessau, Germany, have invented certain new and useful Improvements in an Improved Process for Dyeing Furs, Hairs, and the like, of which the following is a specification.

According to the present invention a kind of organic substances which hitherto has not been used for the purpose in question is employed for dyeing furs, hairs and the like, it having been found that certain derivatives of 2.4-phenylenediamin are most adapted for dyeing these materials obtaining thus deep and full yellow tints varying, generally speaking, from pure yellow to greenish yellow or reddish yellow and possessing a very good fastness against the action of light and weather.

The aforesaid kind of derivatives is represented by the following general formula:

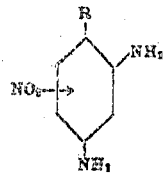

in which formula R means a substituent, such as hydrogen, a halogen, an alkyl group, an alkoxy group and the like. Thus for instance by means of nitro-meta-diaminoanisol, which can be obtained by nitrating diacetyl-meta-diaminoanisol in sulfuric acid and then splitting off the acetyl group, a clear deep yellow is obtained on an unmordanted fur which yellow possesses a very good fastness against the action of light and weather. The substances which according to the present invention are to be applied in the industry of dyeing furs and the like may also be dyed upon the well-known mordants and more especially upon copper-, iron- or chrome-mordants.

The following examples may serve to illustrate my invention, the parts being by weight:

1. The fur to be dyed is previously washed with a diluted solution of ammonia or of sodium carbonate and then thoroughly rinsed. Then it is introduced into the dye-bath which contains per liter 1 part of nitro-meta-diaminoanisol and about 20 parts of hydrogen-peroxid (of about 3% strength). The dyeing is performed for example during 6 hours whereupon the fur is well washed, whirled in a centrifugal machine and finished in the usual manner. Thus is obtained a clear and deep yellow of a very good fastness against light and weather.

2. In order to show the employment of nitro-meta-diaminoanisol in dyeing a mordanted fur one may proceed as follows: The fur after having been well washed as above indicated is mordanted during about 6–12 hours in a bath which contains per liter 2 parts of potassium bichromate, 1 part of acid potassic tartrate and .25 parts of copper sulfate. The fur is then well washed and dyed in a dye-bath containing 1 part of nitro-meta-diaminoanisol and about 20 parts of hydrogen-peroxid of about 3 per cent. strength. In this bath the fur is handled during about 8 hours, well washed and finished in the usual manner. In this way there is obtained a deep and full yellow with a slight cast to red which tint is exceedingly fast against light and weather.

3. In using nitro-meta-toluylendiamin the following procedure may be adopted. The fur, after having been thoroughly cleaned with sodium carbonate in the well known manner, is handled in a bath containing 1 part of nitro-meta-toluylendiamin and about 20 parts of hydrogen peroxid (of about 3% strength) per one thousand parts of water. The dyeing operation having been performed as usual, the fur is finished in the well known manner. There is thus obtained a clear yellow with a strong cast to green, which possesses a very good fastness against light and weather. If dyeing nitro-meta-toluylendiamin upon a suitable fur mordanted, with copper sulfate for instance, a deep yellow with a cast to olive is obtained, which is quite fast against light and weather.

It is obvious to those skilled in the art that the present invention is not limited to the foregoing examples or to the details given therein.

It is obvious that in using such other nitro-diamins of the above-given general formula the proportions of the ingredients as well as the duration of the dyeing or of the mordanting process, may be varied in order to obtain the best results. Also the special conditions of the dyeing process, or of the mordanting process, depend to a great deal upon the special nature of the hairs or the furs, etc., to be dyed as well as of the desired shade. Finally instead of hydrogen-peroxid any other oxidizing agent suitable for the purpose of the present invention may be used.

Having now described my invention and the manner in which it may be performed what I claim is,—

1. The hereinbefore-described process for dyeing furs, hairs and the like which consists in applying to the material to be dyed a solution containing an aromatic nitro-meta-diamin of the general formula:

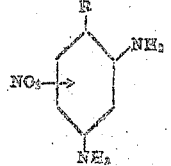

in which formula R means a univalent substituent, and an oxidizing agent.

2. The hereinbefore-described process for dyeing furs, hairs and the like which consists in applying to the material to be dyed a solution containing an aromatic nitro-meta-diamin of the general formula

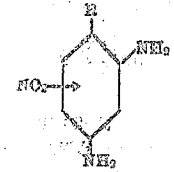

in which formula R means a univalent carbon containing group and an oxidizing agent.

3. The hereinbefore described process for dyeing furs, hairs and the like which consists in applying to the material to be dyed a solution containing an aromatic nitro-meta-diamin of the general formula:

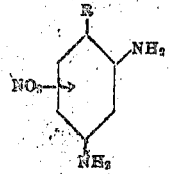

in which formula R means an alkyl group, and an oxidizing agent.

4. The hereinbefore-described process for dyeing furs, hairs and the like which consists in applying to the material to be dyed a solution containing nitro-meta-toluylene-diamin and an oxidizing agent.

5. The hereinbefore-described process for dyeing furs, hairs and the like which consists in applying to the material to be dyed a solution containing nitro-meta-toluylene-diamin and hydrogen-peroxid.

In testimony whereof I have hereunto set my hand in presence of two subscribing witnesses.

KARL MARX.

Witnesses:
 RUDOLPH FRICKE,
 DORIC KRALL.